Jan. 21, 1964

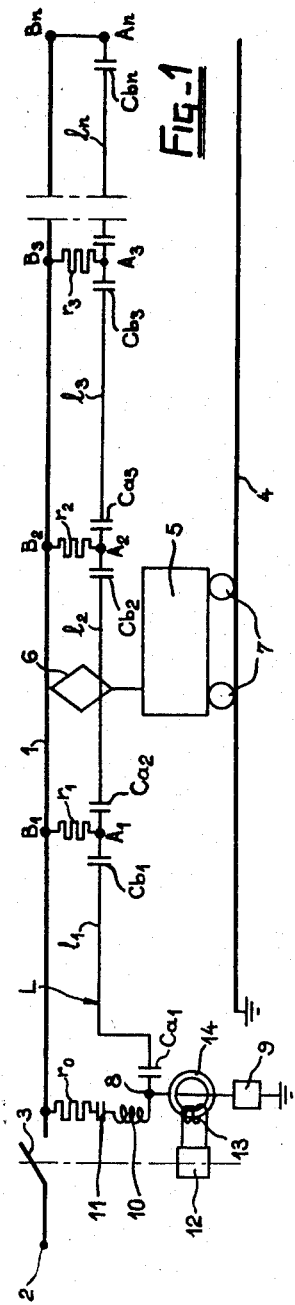
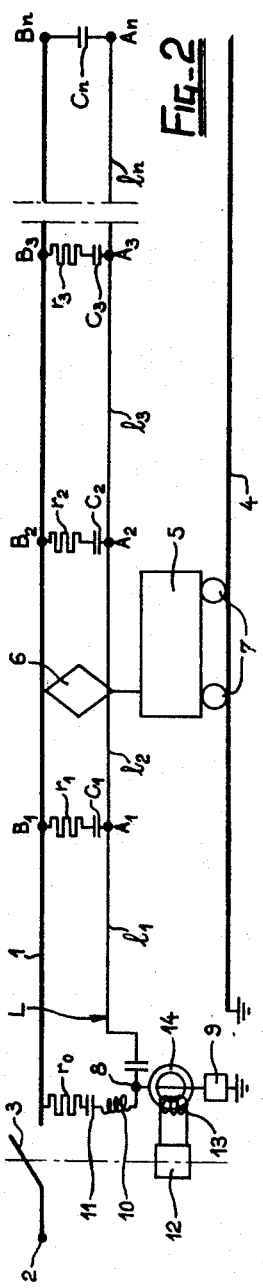
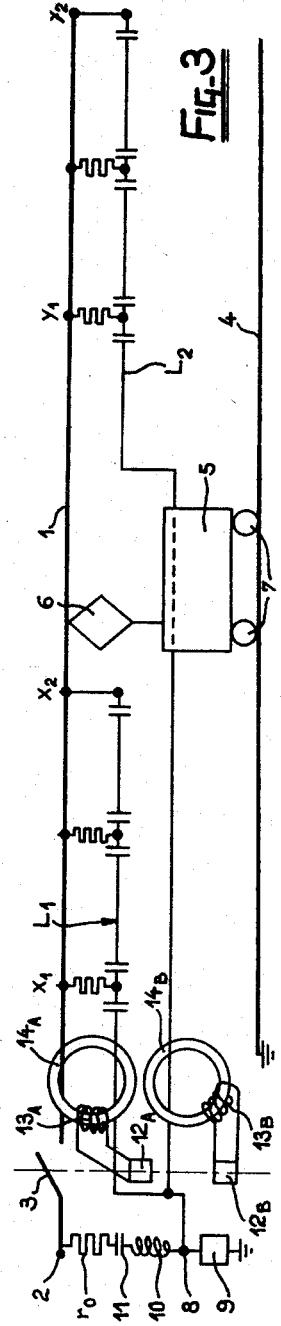

C. GAGNIERE 3,119,050

ELECTRIC NETWORK PROTECTION DEVICE

Filed Jan. 9, 1962

Inventor:
Claude Gagniere
By
Karl W. Flocks
Attorney

United States Patent Office 3,119,050
Patented Jan. 21, 1964

3,119,050
ELECTRIC NETWORK PROTECTION DEVICE
Claude Gagniere, Nogent-sur-Oise, France, assignor to Charbonnages de France, Paris, France, a public institution of France
Filed Jan. 9, 1962, Ser. No. 165,205
Claims priority, application France Jan. 10, 1961
11 Claims. (Cl. 317—29)

Methods of protection of electric distribution networks are already known, in which a monitoring current having a frequency very much greater than the industrial frequency concerned is injected, and in which detectors of the monitoring current reveal the presence of short-circuits which can take place in the network, and actuate circuit-breakers when so required.

However, when the network to be monitored is of great length, it is found that it has an inductive reactance which increases as the monitoring frequency is increased and as the length of line increases, so that this inductive reactance can eventually limit the monitoring current produced in the event of a fault, to a value less than the limit of sensitivity which has been selected to cause tripping of the circuit-breakers.

The present invention has for its object to overcome the above-mentioned fundamental drawback and it has the particular advantage of obtaining, in the event of a fault occurring at any point on a single-phase or direct-current line, such as a trolley-line, an adequate value of the supervisory current.

A further object of the invention is to make it possible to construct monitors which have a sensitivity practically independent of the location of any possible fault.

Another object of the invention is to enable the origin of the fault to be localized by dividing the network into sections.

Still a further object of the invention is to enable either a faulty section to be isolated or to be identified, if it has been preferred to protect the network by a general circuit-breaker device.

A further object of the invention is to improve the sensitivity of detection by distributing over a number of detectors the disturbing signal due to the normal load of the network, so that for each detector, the ratio between the signal due to the fault and the disturbing signal is increased.

The invention is essentially characterized by the fact that it consists in connecting in parallel with the line of the direct-current or single-phase network to be supervised, at least one auxiliary line coupled, preferably at regular intervals, to the line to be supervised, in such manner that each of the sections of the two lines thus defined is tuned to the frequency of the monitoring current.

The invention also relates, by way of new industrial products, to devices for protecting electrical networks, together with the installations comprising an electric network protected by the application of the said devices.

Other particular features, advantages and characteristics of the present invention will become apparent from the description which is given by way of explanation only and not in any limitative sense, reference being made to the accompanying drawings, in which:

FIG. 1 is a connection diagram of a fault-detection system according to the invention, applied to a network which is in the present case a trolley line.

FIG. 2 represents an alternative form of the diagram of connections of FIG. 1.

FIG. 3 is a connection diagram of a fault-detection system which is further improved in that it enables a network similar to that shown in FIGS. 1 and 2 to be divided into sections.

In all the cases shown, the network is one in which protection against short-circuits is ensured by a tripping device actuated by a device which detects the value of a monitoring current having a frequency very much higher than the industrial frequency.

Figure 4:
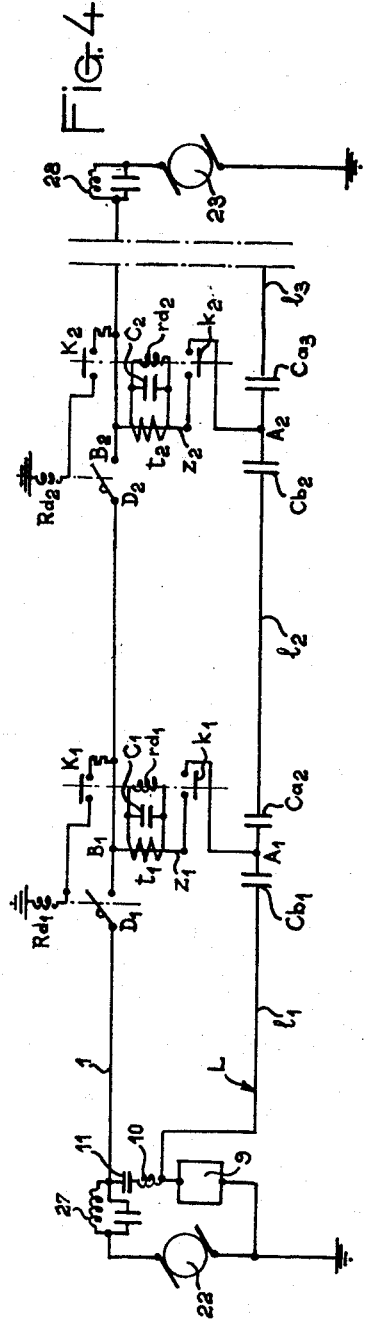
FIG. 4 shows the connection diagram of a protection device according to the invention, comprising circuit-breaker apparatus which permits sections to be isolated.
Figure 5:
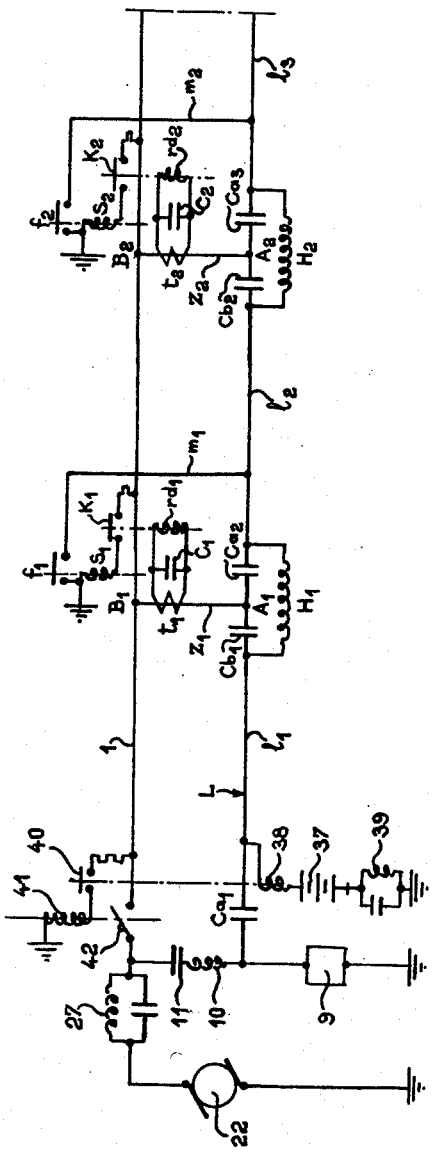
FIG. 5 shows an alternative form of construction in which fault detectors actuate a single circuit-breaker, while permitting the faulty section to be localized.

More particularly, the network to be protected against short-circuits is constituted by a trolley line 1 supplied by a current source 2 through a circuit-breaker 3. The current return is effected in the usual manner either as shown in FIGS. 1, 2 and 3 by the rails 4 on which travels a locomotive shown diagrammatically at 5, and the motors of which are put under tension between the contacts made by the pantograph 6 on the line 1 on the one hand, and the wheels 7 on the rails 4 on the other, of by earth return, as shown in FIGS. 4 and 5.

According to an essential feature of protection according to the invention, there is mounted parallel to the trolley line 1 an auxiliary line L, made-up of an appropriate number of sections, each having for example a length of the order of one kilometer, which are indicated by the references $l_1$, $l_2$, $l_3$ . . . $l_n$. The first section $l_1$ is coupled to the output 8 of the high frequency monitoring current generator 9 through the intermediary of a capacity $C_{a1}$, while the last section $l_n$ is coupled to the trolley line 1 through the intermediary of a capacity $C_{bn}$. Furthermore, each section of the auxiliary line L comprises at its extremities two condensers, in the present case:

$C_{a1}$ and $C_{b1}$ for the section $l_1$
$C_{a2}$ and $C_{b2}$ for the section $l_2$
$C_{a3}$ and $C_{b3}$ for the section $l_3$
--------
$C_{an}$ and $C_{bn}$ for the section $l_n$.

The value of these capacities is determined in such manner that the pairs of capacities of each section form with the natural inductance of the section considered, a circuit tuned to the frequency of the generator 9 and having, for this reason, a minimum impedance $Z_{m1}$, $Z_{m2}$, $Z_{m3}$ . . . $Z_{mn}$ at that frequency.

If the sections are of the same length, the capacities $C_{a1}$, $C_{b1}$, $C_{a2}$, $C_{b2}$ . . . $C_{an}$, $C_{bn}$, are equal; the same thing is true for the natural inductances and the minimum impedances $Z_{m1}$, $Z_{m2}$ . . . $Z_{mn}$ of each of the sections. Since each tuned circuit is not perfect, the impedances $Z_{m1}$, $Z_{m2}$ . . . $Z_{mn}$ are not zero and the result is that the impedance of the auxiliary line L has a value equal to $nZ_m$ at the extremity of the last section $l_n$.

In accordance with a further feature of the connection, the connecting points $A_1$, $A_2$, $A_3$ . . . $A_n$ between the successive sections $l_1$, $l_2$, $l_3$ . . . $l_n$ of the auxiliary line L are connected to corresponding points $B_1$, $B_2$, $B_3$ . . . $B_n$ of the trolley line 1. In order to have at each of the connecting points a substantially constant line impedance, there is interposed in each connection between the auxiliary line L and the trolley line 1 (with the exception of the connection $A_nB_n$) a resistance $r_1$, $r_2$, $r_3$ . . . $r_{n-1}$. If $n$ represents the number of sections, and $x$ is the order number of each connection, it can be seen that the value of a resistance of any order $r_x$ on any connection is such that: $r_x = Z_n(n-x)$, where $x$ varies from 1 to $n$.

In addition, the output terminal 8 of the generator 9 is connected to the trolley line 1 through the intermediary of a filter tuned to the generator frequency and composed of the inductance 10 and the condenser 11 and a resistance $r_0$, the value of which is equal to $nZ_m$.

The value of the high-frequency current injected by the generator 9 is supervised by a detector device 12 supplied from the secondary 13 of a current transformer 14 connected on the generator-network coupling. The detector 12 actuates the circuit-breaker 3 in the usual manner when a short-circuit is produced between the trolley line 1 and earth.

According to an alternative form of embodiment of the invention shown by way of example in FIG. 2, the auxiliary line L is continuous. As in the previous case, this auxiliary line L is connected to the trolley line 1 at regular intervals by means of connections $A_1B_1$, $A_2B_2$, $A_3B_3$ ... $A_nB_n$. With the exception of the last connection $A_nB_n$, these connections each comprise a capacity and a resistance in series, namely $C_1$, $r_1$; $C_2$, $r_2$; $C_3$, $r_3$ ... $C_{n-1}$, $r_{n-1}$.

Each capacity $C_1$, $C_2$ ... $C_n$ forms with the self-inductance of the auxiliary line L on the input side of each connection, a circuit tuned to the frequency of the supervisory current.

The resistances $r_1$, $r_2$ ... $r_n$ have the function of equalizing the sensitivity to tripping from one end of the trolley line 1 to the other. The value of each resistance is, as in the first alternative, equal to $Z_m(n-x)$, where $x$ varies from 1 to $n$. The connection $A_n$, $B_n$ at the extremity of the auxiliary line is made by means of the capacity $C_n$, while the connection of this line L to the generator 9 is made to the terminal 8 of this latter. As in the first alternative form of embodiment, the resistance $r_0$ which is connected in series with the inductance 10 and the capacity 11 on the generator network connection has a value equal to $nZ_m$.

The remainder of the installation and its operation are absolutely similar to those which have been described with reference to the first form of embodiment of FIG. 1.

If it is desired to have a more selective protection enabling the section of the trolley line on which a fault occurs to be located, the improved connection diagram can be adopted as shown by way of example in FIG. 3.

According to this form of embodiment, two auxiliary lines $L_1$ and $L_2$ are provided connected in parallel between the output terminal 8 of the high-frequency monitoring current generator 9 and the trolley line 1. More particularly, the auxiliary line $L_1$ is connected at regular intervals to the trolley line 1 between two points $X_1$, $X_2$ of the first half of this line, for example following the connection employed in the first alternative embodiment. The second auxiliary line $L_2$ is coupled in the same way as the first to the trolley line 1, but this time between two points $Y_1$, $Y_2$ of the second half of this line. In this alternative form shown in FIG. 3, there are also provided two current transformers $14_A$ and $14_B$, the respective primaries of which are constituted by the trolley-line 1 and the first auxiliary line $L_1$ in the case of the transformer $14_A$, and by the second auxiliary line $L_2$ for the transformer $14_B$. The secondary $13_A$ of the transformer $14_A$ supplies a detector-trip device $12_A$, adapted to actuate the circuit-breaker 3 in the event of a short-circuit occurring on the first half $X_1$, $X_2$ of the trolley-line 1. In the same way, the secondary $13_B$ of the transformer $14_B$ supplies a detector-trip device $12_B$ capable of actuating the circuit-breaker 3 in the event of a short-circuit occurring on the second half $Y_1$, $Y_2$ of the trolley-line 1. If a short-circuit takes place on the trolley-line 1 between the two connecting points $X_2$ and $Y_1$, the two detector-trip devices $12_A$ and $12_B$ actuate the circuit-breaker 3 simultaneously.

In addition to the advantage described above, the circuit diagram of FIG. 3 enables the high-frequency supervisory current flowing in all the locomotives such as the locomotive 5 to be reduced by dividing it between the two auxiliary lines $L_1$ and $L_2$, which results in an increase in the sensitivity of the protective device.

It follows from the foregoing description that the improved circuit arrangement of FIG. 3 enables the supervision of the trolley-line 1 to be carried out in sections.

Two auxiliary monitoring lines permit, as has been shown, location of the possible fault in one of the three sections $X_1$—$X_2$, $X_2$—$Y_1$, $Y_1$—$Y_2$, depending on whether one or the other or both of the detector-trips $12_A$ and $12_B$ have operated.

In the same way, three auxiliary lines permit the trolley-line to be delimited in five different sections, or, more generally, $p$ auxiliary lines permit the trolley-line to be divided into $2p-1$ sections.

With the object of ensuring a selective detection of the faults by utilizing the division of the network into sections in the manner previously described, the alternative form of embodiment shown by way of example in FIG. 4 may be adopted. In this alternative, the high-frequency monitoring current which flows in each of the couplings between the auxiliary line L and the line 1 to be supervised, is detected. The monitoring current eventually detected in each of the said couplings is utilized to actuate a breaker device for interrupting the supply of the section in which a fault has occurred.

More particularly, there is shown in FIG. 4 a single-phase network constituted by a supply line 1, the return being effected by earth. This network can be supplied either at one extremity or at both its extremities by the current sources 22 and 23.

As in the previous cases, the injection of the monitoring current delivered from the generator 9 is effected simultaneously into the line 1 and into the auxiliary line L through the intermediary of a filter 10, 11, tuned to the frequency of the current injected. Two antiresonant circuits 27 and 28 block the monitoring current from passing into the supply sources. The contiguous extremities of the sections $l_1$ and $l_2$ are coupled to the line 1 by the common point $A_1$ of two condensers $C_{b1}$ and $C_{a2}$ through the intermediary of a coupling connection $Z_1$, comprising in series a current transformer $t_1$, the secondary of which is tuned to the monitoring frequency by the condenser $c_1$, the secondary of the said current transformer supplying a relay $rd_1$ with a holding winding which controls an auxiliary contact $k_1$ being closed when the relay $rd_1$ is de-excited. The same relay $rd_1$ controls through its contact $K_1$ the supply of a trip-coil $Rd_1$ of the circuit breaker $D_1$. The couplings $Z_2$, $Z_3$ ... $Z_n$ comprise devices identical with those of the coupling connection $Z_1$.

If a fault occurs on the line 1, for example between the points $B_1$ and $B_2$, either or both of the detection devices of the couplings $Z_1$ and $Z_2$ will operate. In fact, if the fault between $B_1$ and $B_2$ is very close to a coupling point ($B_2$ for example) only the detector connected on the coupling $Z_2$ will operate, since the impedance of the circuit followed by the control current is then lower in the coupling $Z_2$ than in the coupling $Z_1$, by reason of the mainly inductive impedance of the section $B_1$—$B_2$. However, the excitation of the relay $rd_2$ causes the opening of the circuit-breaker $D_2$ at the same time as the opening of the coupling $Z_2$, which opening is maintained because of the magnetic or electric holding contact of the said relay $rd_2$. If the fault is maintained, almost the whole of the monitoring current will then flow through this fault by the single coupling $Z_1$. It is then obvious that the detection device of this coupling $Z_1$ will cause in its turn the opening of the circuit-breaker $D_1$. The section $B_1$—$B_2$ will then be completely isolated.

According to an alternative form of embodiment shown in FIG. 5, the monitoring current detected in each of the couplings is employed to actuate a remote-control device for a general circuit-breaker, by injection of an auxiliary current having different characteristics from that of the monitoring current, this auxiliary current being advantageously a direct current.

In FIG. 5, there is shown a network comprising a supply line 1 and an alternating or direct-current source 22. The high-frequency generator 9 injects the monitoring current into the line 1 through the tuned filter 10, 11 and into the auxiliary line L. The anti-resonant circuit 27 blocks the monitoring current from passing into the source 22. A source of direct current 37 is connected between earth and the auxiliary line L through the intermediary of the coil of a tripping relay 38. A filter 39 is preferably added in order to block the passage in this coupling of an alternating current coming from the line 1 to be protected, this current being derived from the source 22 and being due either to the fact that the source is alternating or to the fact that the direct-current source 22 is constituted by a rectifier unit having a residual ripple frequency.

On the couplings, $Z_1$, $Z_2$ . . . , there are provided the current transformers $t_1, t_2$ . . . , the secondaries of which, tuned to the control frequency by condensers $c_1, c_2$ . . . , supply tripping relays $rd_1, rd_2$ . . . , these tripping relays causing when excited the closure of the contacts $K_1$, $K_2$ . . . , which close the supply circuits of the relays $S_1$, $S_2$ . . . , these relays when excited completing the connections to earth of the sections $1_1$, $1_2$ . . . of the auxiliary line, through the intermediary of the couplings $m_1$, $m_2$.

In case of action of a detection device of one of the couplings $z_1$, $z_2$ for example, the direct-current supplied from source 37 then passes through the relay 38, the auxiliary line L, the coupling $m_2$, earth and the filter 39. This current passes round the capacitive couplings $Cb_1$—$Ca_2$, $Cb_2$—$Ca_3$, by virtue of the inductances $H_1$ and $H_2$, the impedance of which to the control current is very high as compared with those of the capacities for which they provide a shunt path.

The circulation of this current causes the excitation of the relay 38 which causes the supply by its contact 40 of the tripping coil 41 of the general circuit-breaker 42, thus resulting in its opening.

It can be seen that when a fault occurs between two coupling points, $B_1$ and $B_2$ for example, either or both the devices mounted on the connections $Z_1$, $Z_2$ on each side of the location of the fault will act to cause interruption of the supply by the circuit-breaker 42. If care has been taken to use holding relays as the relays $S_1$, $S_2$ . . . , there is then available at the same time an indication means which enables the fault to be located, since it is known that the interruption has been caused by a fault situated in one of the two sections on each side of the relay which has tripped. If two relays have tripped, as has been explained for FIG. 1, the fault is localized in the section which is between these two relays.

It is quite clear that the form of embodiment shown in FIG. 5 is applicable to a network supplied by two sources or a number of sources, by means of the addition to each supply of a direct-current injection device comprising a source 37, a filter 39 and a relay 38, a circuit-breaker 42 and the other necessary accessories.

It will furthermore be understood that the invention has been described and shown in a purely explanatory manner only and without any implied limitation, and that modification of detail can be made without departing from the scope of the said invention.

I claim:

1. In a protection device against short-circuits occurring in an electric network at industrial frequency, comprising a distribution line, a supply current source, at least one circuit-breaker means for interrupting the said supply, a high-frequency generator electrically coupled to said network and delivering into said network an alternating monitoring current having a frequency very much higher than the industrial frequency, at least one detector system responsive to said supervisory current and adapted to actuate said circuit-breaker above a threshold value reached by said monitoring current in the event of a short-circuit occurring in the network, the combination:

(a) of at least one auxiliary line connected in parallel with the line of the network to be supervised;
 (b) of coupling circuits disposed at substantially regular intervals between the line to be supervised and said auxiliary line;
 (c) said coupling circuits defining a series of sections of the two lines;
 (d) of means for tuning each of the said sections of two lines to the frequency of the monitoring current.

2. The combination in the device as claimed in claim 1, in which said means for tuning each of the sections of two lines to the frequency of the monitoring current are constituted by coupling capacities placed in series on the auxiliary line, at the two extremities of each section of said auxiliary line.

3. The combination in the device as claimed in claim 1, in which said means for tuning each of the sections of two lines to the frequency of the monitoring current are constituted by coupling capacities placed in series on said coupling circuits between the two lines.

4. The combination in the device as claimed in claim 1, in which the coupling circuits defining the sections comprise resistances, the respective values of which are smaller as the corresponding coupling is more distant from the supply current source for the line to be supervised.

5. The combination in the device as claimed in claim 1, in which the monitoring current delivered by the high-frequency generator is injected into the auxiliary line parallel to the line of the network to be supervised.

6. The combination in the device as claimed in claim 1, and further comprising: means for injecting the monitoring current delivered by the high-frequency generator in parallel into the line of the network to be supervised and into the auxiliary line; and at least one detector system responsive to the sum of the monitoring currents flowing though the line of the network to be supervised and through said auxiliary line.

7. The combination in the device as claimed in claim 1, and further comprising; means for injecting the monitoring current delivered by the high-frequency generator in parallel into the line of the network to be supervised and into the auxiliary line, and detector systems responsive to the value of the monitoring current flowing through each of the coupling circuits between the line of the network to be supervised and said auxiliary line.

8. The combination in the device as claimed in claim 1, and further comprising; a plurality of auxiliary lines connected in parallel with the line of the network to be supervised; a plurality of coupling circuits, of which the elements of each series are disposed at substantially regular intervals between a section of the line to be supervised and one of said auxiliary lines; means for injecting the monitoring current delivered by said high-frequency generator in parallel into the line of the network to be supervised and into said auxiliary lines; detector systems equal in number to the number of said auxiliary lines, one of said detectors being responsive to the sum of the monitoring currents flowing through the line of the network to be supervised and through one of said auxiliary lines, the other detectors being each responsive to the value of the monitoring current flowing through one of the other auxiliary lines.

9. The combination in the device as claimed in claim 2, and further comprising: as many devices for interrupting the supply of the network as there are coupling circuits between the line of the network to be supervised and the auxiliary line; means for injecting the monitoring current delivered by the high-frequency generator in parallel into the line of the network to be supervised and into said auxiliary line; as many detector systems responsive to the value of the monitoring current as there are coupling circuits, each of said detector systems being responsive to the value of the monitoring current flowing through each of said coupling circuits; and means whereby each of said detector systems actuates the circuit-breaker device of the section in which a fault has occurred.

10. The combination in the device as claimed in claim 2, and further comprising; means for injecting the monitoring current delivered by the high-frequency generator in parallel into the line of the network to be supervised and into said auxiliary line; an auxiliary current generator of different characteristics to that of the monitoring current, said auxiliary current being injected into the auxiliary line; as many detector systems responsive to the value of the monitoring current as there are coupling circuits, each of said systems being responsive to the value of the monitoring current flowing through each of said coupling circuits; means whereby each of said detector systems causes the passage of said auxiliary current in the auxiliary line in the event of short-circuit; and means whereby the passage of said auxiliary current causes the operation of the circuit-breaker device to interrupt the supply to the said network.

11. The combination as claimed in claim 10, in which the auxiliary current having a different nature from that of the monitoring current, is a direct current.

References Cited in the file of this patent
UNITED STATES PATENTS

| | | |
|---|---|---|
| 1,593,369 | Stone | July 20, 1926 |
| 1,831,338 | Brown | Nov. 10, 1931 |